US008063823B2

(12) United States Patent
Ruelke et al.

(10) Patent No.: US 8,063,823 B2
(45) Date of Patent: Nov. 22, 2011

(54) METHOD FOR GENERATING A LOCATION SIGNAL

(75) Inventors: Charles R. Ruelke, Margate, FL (US);
Armando J. Gonzalez, Miami, FL (US);
Charles B. Swope, Coral Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 408 days.

(21) Appl. No.: 12/335,091

(22) Filed: Dec. 15, 2008

(65) Prior Publication Data

US 2010/0149040 A1    Jun. 17, 2010

(51) Int. Cl.
*G01S 1/08*  (2006.01)
(52) U.S. Cl. ........................................ 342/386
(58) Field of Classification Search .................. 342/385, 342/386
See application file for complete search history.

(56) References Cited

U.S. PATENT DOCUMENTS

| | | | |
|---|---|---|---|
| 4,129,868 A * | 12/1978 | Tahara et al. .................. 342/51 |
| 5,022,046 A * | 6/1991 | Morrow, Jr. .................. 375/130 |
| 5,175,729 A | 12/1992 | Borras | |
| 5,859,613 A | 1/1999 | Otto | |
| 6,243,588 B1 * | 6/2001 | Koorapaty et al. ........ 455/456.2 |
| 6,476,681 B1 * | 11/2002 | Kirkpatrick ...................... 331/17 |
| 6,549,562 B1 * | 4/2003 | Olaker et al. .................. 375/139 |
| 6,611,758 B1 | 8/2003 | Nysen | |
| 7,068,704 B1 * | 6/2006 | Orr ................................ 375/139 |
| 7,215,167 B1 | 5/2007 | Hassun | |
| 7,298,809 B2 | 11/2007 | Craninckx | |
| 2007/0111737 A1 | 5/2007 | Swope | |
| 2008/0224895 A1 * | 9/2008 | Krishna et al. ................ 340/988 |

OTHER PUBLICATIONS

PCT International Search Report Dated Jul. 14, 2010.

* cited by examiner

*Primary Examiner* — Gregory C Issing
(74) *Attorney, Agent, or Firm* — Valerie M. Davis; Daniel R. Bestor

(57) ABSTRACT

A communication device uses its FGU to generate a location signal that can be used by a reference device to calibrate the communication device and to determine the distance of the communication device from the reference device. The communication device: receives, from a reference device, at least one location signal control parameter that defines pulse shape characteristics for a location signal; configures its FGU based on the at least one location signal control parameter; generates a linear first part of a phase-incoherent location signal having the defined pulse shape characteristics by progressively sweeping an output of the FGU over a range of frequencies from a first frequency to a second frequency within a first time period; and transmits at least one iteration of the first part of the location signal.

18 Claims, 8 Drawing Sheets

METHOD FOR GENERATING A LOCATION SIGNAL

CROSS-REFERENCE TO RELATED APPLICATIONS

The present application is related to the following U.S. application commonly owned together with this application by Motorola, Inc.:

Ser. No. 12/335,156, filed Dec. 15, 2008, titled "Method and Device for Generating a Location Signal", Gonzalez, et al.

TECHNICAL FIELD

The technical field relates generally to location technology and more particularly to a method for generating a location signal in a communication device that can be used for ranging.

BACKGROUND

Communication devices such as portable two-way radios vastly improve the effectiveness of police, fire, and military personnel in a public or military emergency situation. Often the first responders at an emergency site communicate with subsequent responders to direct them to respond effectively in the emergency situation where it is often critical to locate the responders and entities such as sensors, portable communication devices, and the like. A variety of solutions are available for determining the location of a responder and various entities, which can be segmented into three basic groups: outdoor, indoor, and indoor/outdoor solutions. Outdoor location solutions typically provide two-dimensional location information in outdoor areas such as streets, parks, stadiums, markets, and the like. Typically, the outdoor solutions include Global Positioning System (GPS) based location determination solutions. Indoor solutions typically provide three-dimensional location information in a more localized area such as in buildings, warehouses, and the like. Generally, indoor solutions require dense installation of field-deployable infrastructure and have stringent location accuracy requirements. Indoor/outdoor solutions provide wide area location information for multi-building campuses. Conventionally, an indoor/outdoor location solution requires a combination of outdoor tracking technologies and installation of indoor tracking support infrastructure.

There are several inherent shortcomings in the existing location determination technologies that inhibit their usage in an indoor/outdoor solution for determining location. Generally, a GPS-based solution does not work reliably in dense urban areas. Further, a GPS-based solution cannot be used as an indoor solution for determining location. Network overlay solutions usually provide better outdoor coverage at the expense of accuracy. Dedicated systems usually provide both coverage depth and accuracy, but at a high infrastructure cost.

Thus, there exists a need for a method of generating a location signal in a communication device that can be used both for indoor and outdoor range determination for the communication device.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
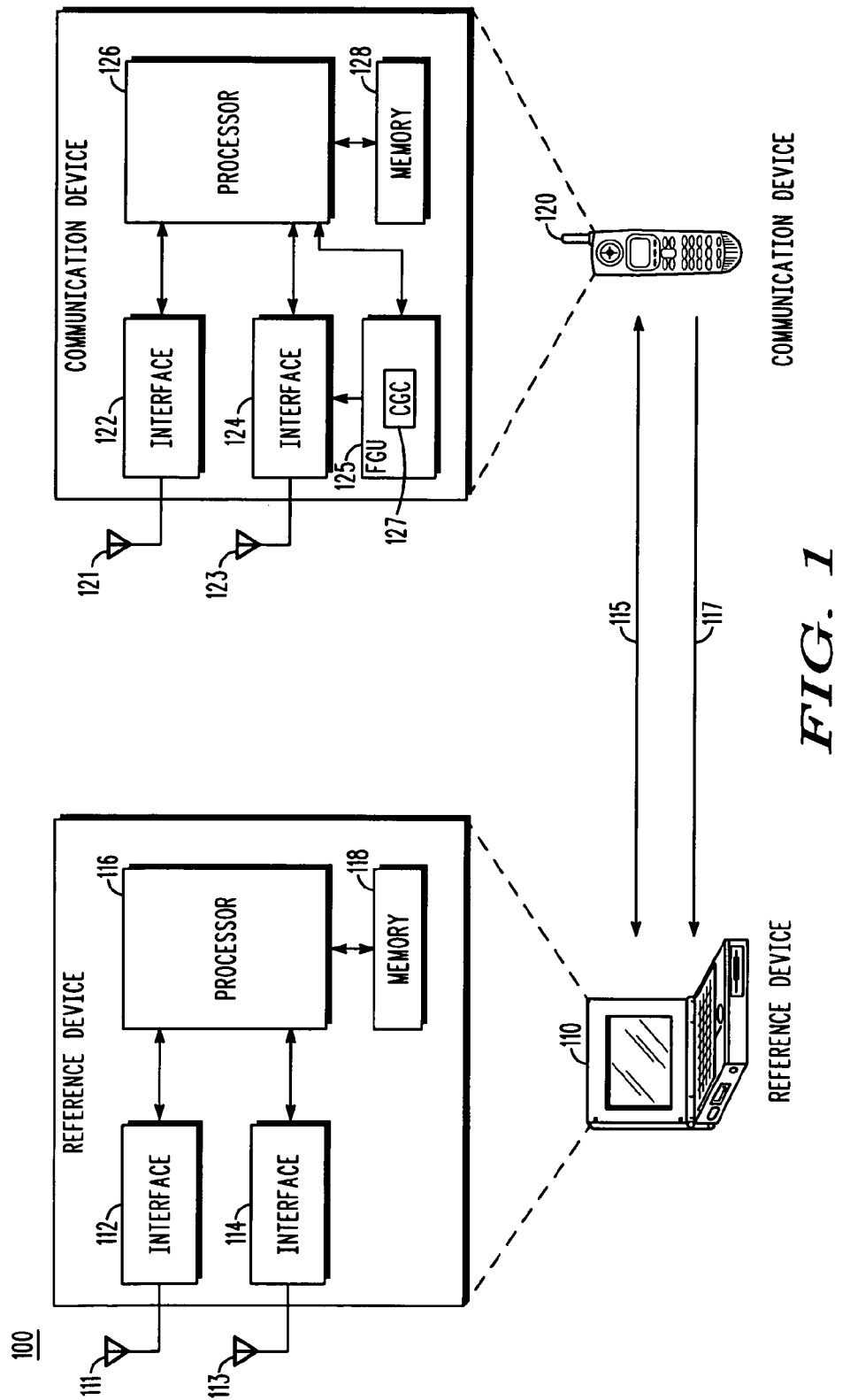
FIG. 1 is a block diagram that shows a reference device communicating with a communication device to determine the location of the communication device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a communication device uses its frequency generation unit (FGU) to generate a location (e.g., chirp) signal that can be used by a reference device to calibrate the communication device and to determine the distance of the communication device from the reference device. The communication device: receives, from a reference device, at least one location signal control parameter that defines pulse shape characteristics for a location signal; configures its FGU based on the at least one location signal control parameter; generates a linear first part of a phase-incoherent location signal having the defined pulse shape characteristics by progressively sweeping an output of the FGU over a range of frequencies from a first frequency to a second frequency within a first time period; and transmits at least one iteration of the first part of the location signal.

In one embodiment, a phase locked loop FGU having a voltage controlled oscillator (VCO), an adjustable filter that incorporates at least one component having a reactive value that is predominately capacitive, a synthesizer with an adjustable charge pump, a radio controller, and ramp timers is used to generate chirp location signals. In this embodiment, the radio controller sends control signals to set the adjustable filter to wideband operation, to set the gain and polarity of the adjustable charge pump, and to initialize the ramp timers. A first gain and polarity of the charge pump generates a first constant current having a first magnitude that charges the filter capacitive element for a first time period set by a ramp timer, which provides a control signal that steers the VCO output to generate the first part of the chirp signal. The slope of the first part of the chirp signal is a function of the magnitude of the first current, the capacitance value, and the first time period.

In another embodiment, a delay locked loop FGU having a plurality of delay elements each providing a different delayed output relative to a reference clock signal is used to generate chirp location signals. In this embodiment, the communication device selects a sequence of the delayed outputs to progressively steer the signal output over the range of frequencies to generate the location signal.

Those skilled in the art will recognize that the FGU apparatus used to generate the chirp location signal need not be limited to the preceding illustrative examples. Other FGU systems of varying complexity may also be adaptable to create chirp location signaling. Alternative FGU systems may include any one or more of the following components: programmable high speed Digital-to-Analog Converters (DAC) with sufficient voltage range and resolution for steering a VCO; any filter configuration (active, passive, discrete or integrated) being adjustable over a sufficiently wide bandwidth range; any feedback strategy whereby the FGU output frequency is compared to a known reference for generating an error signal; and appropriate control logic for controlling the FGU operation during standard narrowband operation and during chirp location signaling for a wideband channel. As such, other alternate FGU implementations are contemplated and are within the scope of the various teachings described herein.

The chirp signals can be used to calibrate the communication device, and based on calibrated (or steady state) internal processes of the communication device to accurately determine a distance to the communication device without the need for complex and expensive infrastructure. Basically, a single reference device is able to accurately determine its distance from the communication device using knowledge of the calibrated state of the communication device and the chirp signals generated by the communication device that are received at the reference device. Those skilled in the art will realize that the above recognized advantages and other advantages described herein are merely illustrative and are not meant to be a complete rendering of all of the advantages of the various embodiments.

Referring now to the drawings, and in particular FIG. 1, a block diagram illustrates a system 100 comprising a reference device 110 communicating with a communication device 120 to participate in a training process for the communication device and to determine the location of the communication device. The communication device 120 generates location (e.g., chirp) signals using its frequency generation unit (FGU), in accordance with some embodiments, and transmits the location signals to the reference device 110 to use in the training process and the subsequent location determination.

In the described embodiments, the reference device 110 and the communication device 120 operate in accordance with Project 25 (P25 or APCO 25) standard protocols, which are a suite of standards for digital radio communications that are produced through the joint efforts of the Association of Public Safety Communications Officials International (APCO), the National Association of State Telecommunications Directors (NASTD), selected Federal Agencies and the National Communications System (NCS), and standardized under the Telecommunications Industry Association (TIA). However, the teachings described herein are in no way limited to this system implementation. Those skilled in the art will recognize and appreciate that the specifics of this example are merely illustrative of some embodiments and that the teachings set forth herein are applicable in a variety of settings. As such, other alternate implementations with the devices using different protocols are contemplated and are within the scope of the various teachings described herein. Also, the reference device 110 can be associated with more than one communication device to determine locations of a plurality of communication devices.

As used herein, the term reference device includes, but is not limited to, equipment commonly referred to as access points, access terminals, base stations, incident command stations, and any other device capable of interfacing with a communication device in a wireless environment. In accordance with some embodiments, the reference device 110 can be portable, such as in the case of the laptop computer 110 shown in FIG. 1. As such, the reference device 110 can be installed in a vehicle such as a fire truck. As used herein, the term communication device includes, but is not limited to, equipment commonly referred to as mobile devices, access terminals, two-way radios, portable radios, and any other device capable of operating in a wireless environment. Typically, the communication device 120 is portable and it can be carried by a responder to an emergency situation.

As shown in FIG. 1, the reference device 110 comprises an interface 112, an interface 114, a processor 116, a memory 118, and antennas 111 and 113; and the communication device 120 comprises an interface 122, and interface 124, a processor 126, a memory 128, antennas 121 and 123 and a frequency generation unit (FGU) 125 that includes Chirp Generation Control circuitry (CGC) 127 to generate a sequence of wideband "chirp" signals used as location pulses. The reference device 110 and the communication device 120 are also equipped with a transceiver, i.e., transmitter and receiver apparatus (not shown), coupled to the interfaces and antenna, which includes FGUs, and is further equipped with other components, such as one or more timers, as needed for a commercial embodiment.

The transceiver, memory and processors can have any suitable physical implementation and are topologically coupled depending on the particular device implementation. These components are further operatively coupled and can be adapted, arranged, configured, and designed to perform methods in accordance with the teachings herein, for instance, as illustratively described by reference to FIG. 1 through FIG. 10. For example, memories 118 and 128 and processors 116 and 126 are each depicted as a single physical device, but it is well understood that any of those elements can comprise multiple such elements. For instance, the "processing device" can include one or more processors, microprocessors, etc. and the "memory" can comprise one or more storage units such as random access memory (RAM), read only memory (ROM), databases, etc., for performing the intended functionality in accordance with the teachings herein.

In accordance with this illustrative embodiment, the devices 110 and 120 include two interfaces and two antennas for communicating using two different channels, wherein the channels are the physical communication resources over which information is sent between the devices 110 and 120 and can comprise wired links or wireless links (as in the present case). For wireless channels, the corresponding physical resource is an allocation of radio spectrum that is partitioned into radio frequency (RF) carriers that are modulated by a media (e.g., audio, video, data, etc.) or a control (e.g., requests from the reference device for location signals and the corresponding transmitted location signals, etc.) stream.

More particularly, interface 112 and antenna 111 of the reference device 120 communicate with the interface 122 and antenna 121 of the communication device 120 on a narrowband channel 115, which in this example is an APCO 25 data channel but can be any type of wireless channel having any suitable bandwidth. For the purposes of this application, a narrowband channel is defined as any wireless channel having channel spacing equal to or less than 500 kHz. In accordance with the teachings herein, the reference device 110 uses the interface 112 and antenna 111 to transmit and receive control information related to an inbound location pulse sequence.

The interface 114 and the antenna 113 of the reference device 110 communicate with the interface 124 and antenna 123 of communication device 120 on a channel 117. In accordance with the teachings herein, the reference device 110 receives a sequence of location pulses from the communication device 120 on the channel 117. In the described embodiments, the channel 117 is a wideband channel. For the purposes of this application, a wideband band channel is defined as a wireless channel having a frequency span equal to or greater than 5 MHz. In one embodiment, a location pulse signal from the communication device 120 sweeps over a frequency range of 50 MHz when communicated on channel 117 and is, therefore, said to have a bandwidth (BW) of 50 MHz.

Antennas 111, 113, 121 and 123 may be omni-directional, sectored, MIMO (Multiple In, Multiple Out, a technology that allows antennae to process numerous incoming and outgoing signals simultaneously), or a smart antenna array. In accordance with one embodiment, the antennas 111, 121, and 123 are each an Omni-directional antenna, while the antenna 113 is a narrow beam phase array or scanning antenna. However, the reference device and communication device antenna structures need not be limited in this fashion. In accordance with alternate embodiments, a single antenna may also be used for both communicating on the narrowband channel and receiving on the wideband channel. If a single antenna topology is employed, an antenna switch may also be incorporated at the junction of the antenna and the two interfaces, as is well known in the art.

As mentioned earlier, the communication device 120 further comprises FGU 125 circuitry that generates the wideband location pulses sent to and used by the reference device 110 during a training process and thereafter to determine its distance from the communication device 120. The type of FGU used is a matter of design preference based on a given device implementation, and the manner in which the communication device 120 generates wideband location signals, in accordance with the teachings herein, is based on the particular FGU topology.

Figure 3:
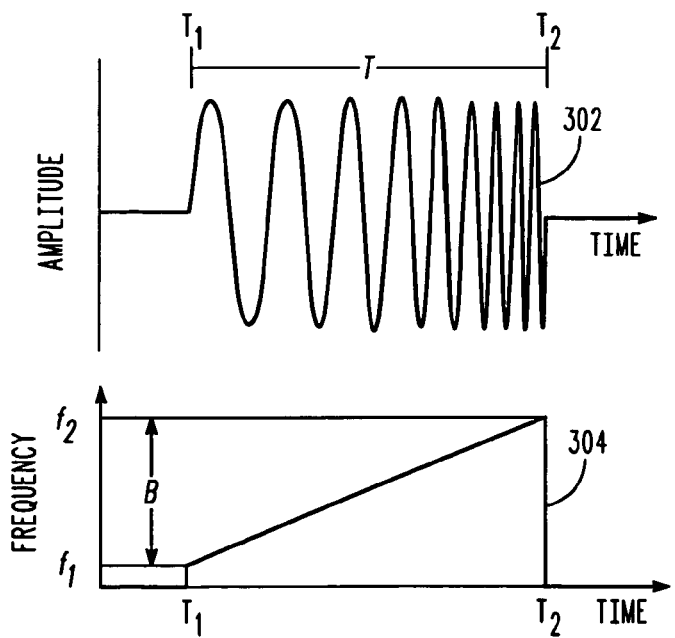
FIG. 3 illustrates a chirp signal having a positive slope in accordance with some embodiments.
Figure 4:
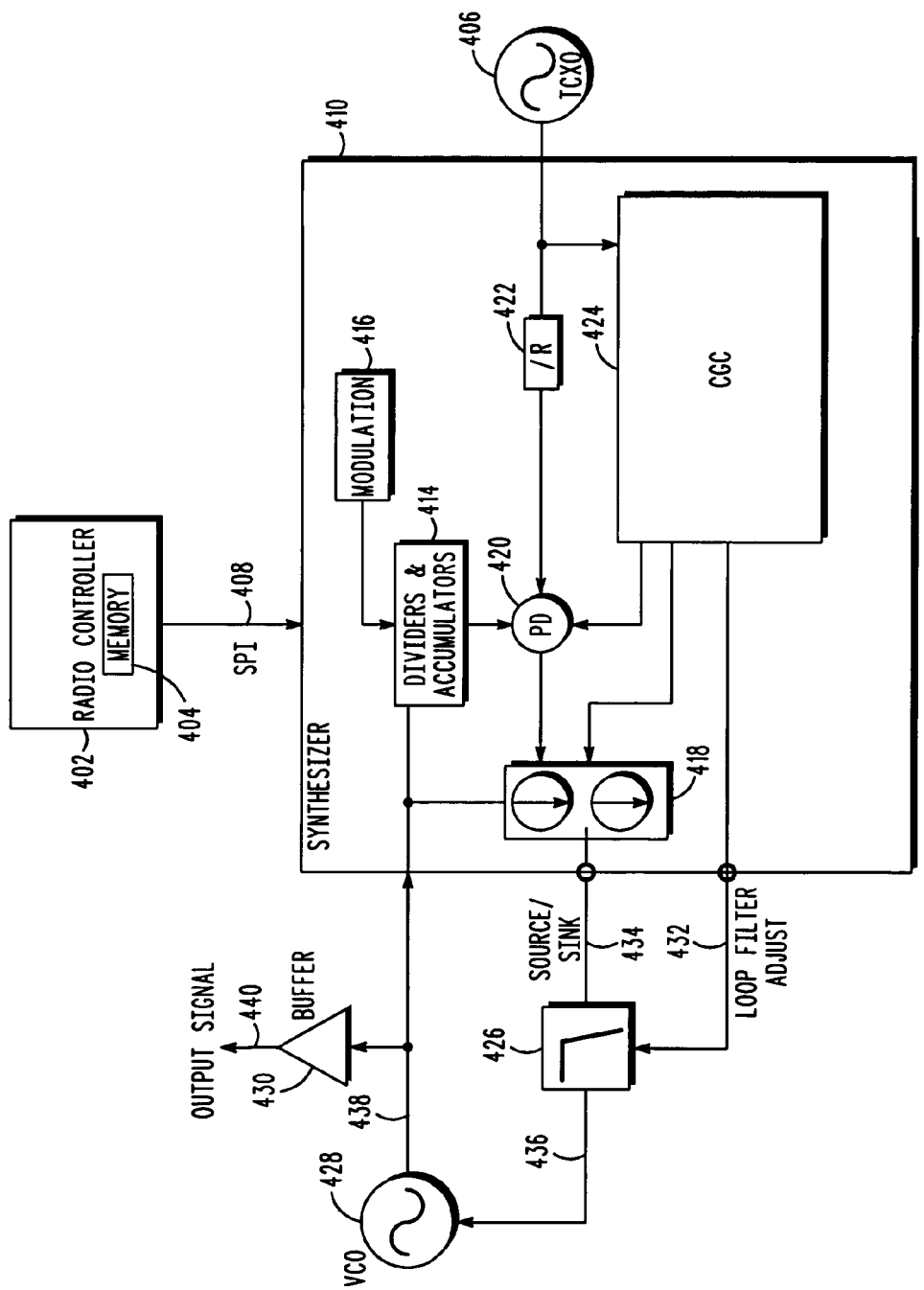
FIG. 4 illustrates a phase locked loop (PLL) frequency generation unit (FGU) used to generate chirp signals in accordance with some embodiments.
Figure 9:
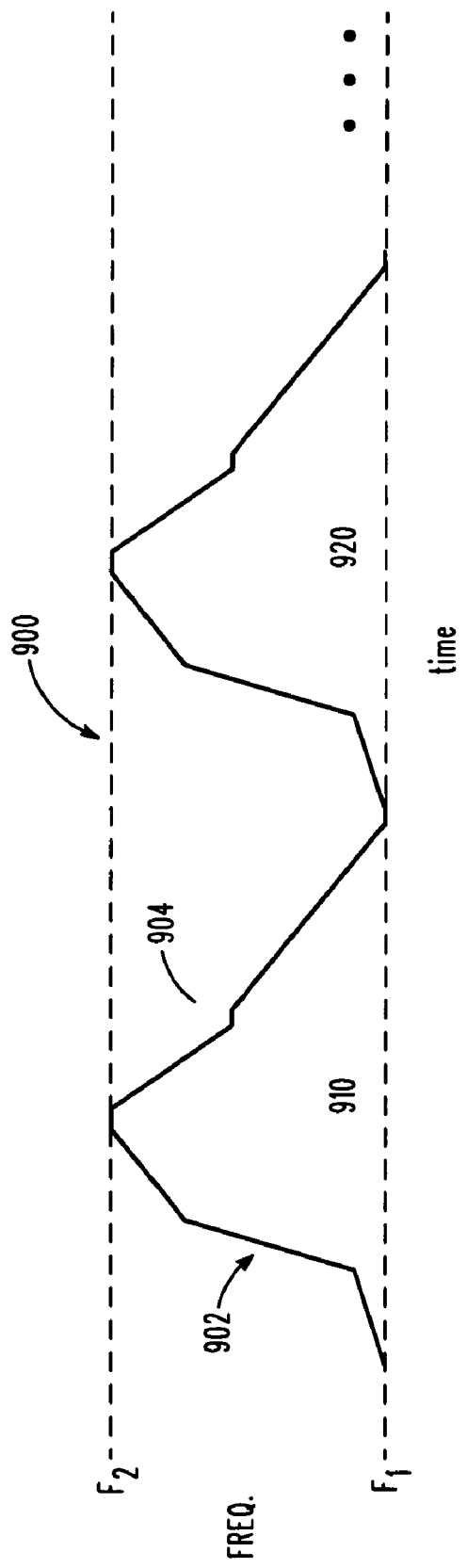
FIG. 9 illustrates a chirp sequence with each part having multiple slope transitions in accordance with some embodiments.
Figure 10:
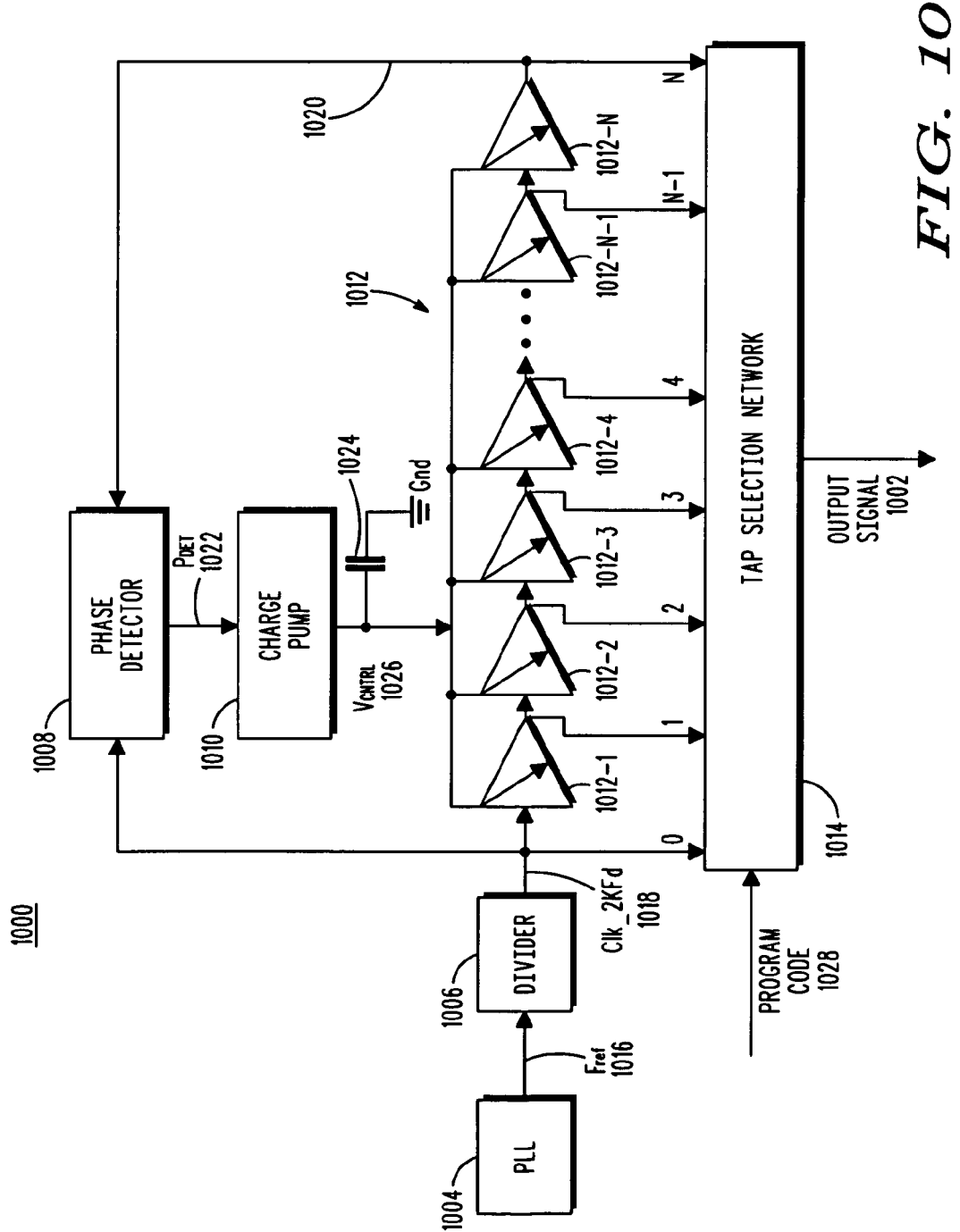
FIG. 10 illustrates a delay locked loop FGU used to generate chirp signals in accordance with some embodiments.

By way of illustration, methods performed by a communication device (e.g., communication device 120) of generating wideband location signals using a FGU comprising a multi-accumulator synthesizer within a phase locked loop (PLL), (e.g., as shown in FIG. 4) or using a FGU comprising a delay locked loop (DLL) for direct digital synthesis, (e.g., as shown in FIG. 10), are next described by reference to FIG. 1 to FIG. 10. However, the implementation of the teachings herein is not limited to these particular FGU topologies but can be applied to any suitable FGU topology. Moreover, it will be appreciated that the methods described in accordance with the teachings herein include functionality that may be performed in hardware, firmware, software or a combination thereof.

Figure 2:
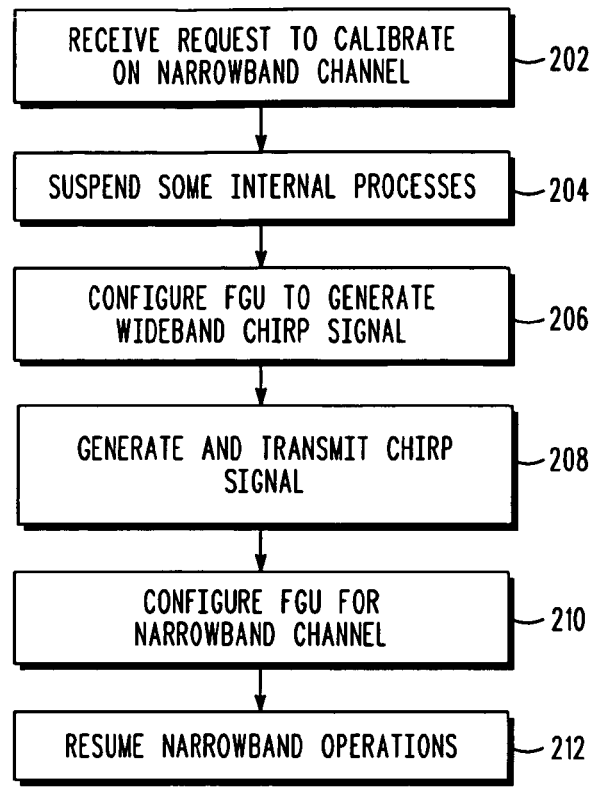
FIG. 2 is a flow diagram of a method for generating a location signal in accordance with some embodiments.

Turning now to FIG. 2, illustrated therein is a flow diagram of a method 200 for generating a location signal in a FGU in accordance with some embodiments. During normal radio communications of the communication device, the FGU 125 (also referred to in the art as a frequency synthesizer) generates the appropriate frequency signals needed to transmit and receive narrowband signals on channel 115, wherein the narrowband signals include voice or other media sent between at least two devices using a wireless interface. Some embodiments of a FGU (like the FGU illustrated in FIG. 4) include a Voltage Controlled Oscillator (VCO), a synthesizer loop filter, a reference frequency oscillator, and a synthesizer Integrated Circuit (IC) (that includes at least one charge pump, a phase detector, and a frequency divider) controlled by a microprocessor, wherein the microprocessor can be integrated into the processor 126 or implemented as a separate processing device. Other embodiments of the FGU (like the FGU illustrated in FIG. 10) include a PLL, a frequency divider, a phase detector, a charge pump, a delay line (with multiple delay elements), and a tap selection network controlled by a microprocessor.

Normal operation of the communication device 120 using its FGU to communicate signals on the narrowband channel 115 occurs until the communication device is prompted by internal or external commands to transmit location signals. In one embodiment, the communication device 120 receives (202) a request from the reference device 110 to generate one or more location signals, and the communication device sends the location signals in response thereto; which can be used by the reference device to train (or calibrate) the communication device or to calculate range (distance) information for a calibrated communication device. The request message may include one or more chirp control parameters for defining the inbound location signal pulse shape characteristics. In general, a single location pulse is associated with at least one positive slope (+K) linear frequency ramp or negative slope (−K) linear frequency ramp. For the purposes of the teachings herein, the term linear means a fixed frequency variation in time (e.g., slope) when generating a ramp response that is sweeping between two terminus frequencies $f_1$ and $f_2$. Accordingly, the chirp control parameters can include, but are not limited to, chirp slope, counter values during which the slope is maintained, and start and stop frequencies for the chirp response. In the case of the FIG. 4 FGU implementation, these parameters may be embodied as charge pump gain (or magnitude) and charge pump polarity and code plug values for generating specific terminus frequencies.

In an APCO 25 system implementation, the reference device 110 and the communication device 120 both contain APCO 25 modems for communicating over the APCO 25 data channel 115. In accordance with one embodiment, the APCO modem of the reference device transmits to the APCO modem of the communication device an APCO 25 data packet that can easily fit into a User Datagram Protocol (UDP) frame. Generally, in an APCO 25 data mode, 512 bytes of data with only 480 bytes of useable message or data space are transmitted. Table 1 illustrates some of the key commands, control, or data that may be needed to manage the training and sampling of the ranging location signal. Table 1 consists of the chirp control parameters needed to define the slope (K) of the signal the reference device receiver expects to see. Table 1 also defines how many training pulses to use and the rate. The transmit (TX) time is sent if available (course ranging) along with pulse shaping information (fine ranging). If the training bit is logic 0, then the reference device is requesting a sample.

TABLE 1

Location Range Message

| Message | Format |
|---|---|
| Start Freq | Actual or coded |
| Stop Freq | Actual or coded |
| Duration | Actual or coded |
| # pulses | 0 to $2^8$ |
| Burst Rate | 0 to $2^8$ |
| TX time | ns or clocks from RX |
| Shaping data | Actual or Coded |
| Null data | Actual or Coded |
| Weighting | 3-8 bit (none, cosine, $\cos^2$, etc.) |
| Training Bit | 0 = true range, 1 = in training |

It should be noted that the chirp control parameters need not be received in a location signal request from the reference device. The reference device may send the chirp control parameters at any time before calibrating the communication device, wherein the communication device stores these parameters for future use. In addition, the reference device can transmit the chirp control parameters either via a wired or wireless link and if using a wireless link, any suitable wireless protocol can be used to transmit the message containing the chirp control parameters. Accordingly, in an alternative embodiment, the communication device periodically (and not responsive to a request) transmits the location signals to the reference device for range calculations. In this embodiment, the communication device has stored in its memory the control parameters defining the location signal.

Upon the APCO modem of the communication device receiving ( 202 ) the request for a location signal from the APCO modem of the reference device, the APCO modem of the communication device sends acknowledgements (ACK) and permissions to an Application Programming Interface (API) in the communication device (e.g., an API for a microprocessor (radio) controller), which sends control signals to suspend (204) non-critical internal processes. Suspending some internal processes minimizes the time taken by the communication device to send the location signals and also stabilizes its internal processes to an optimized (e.g., calibrated) state so as to enable the reference device to make more consistent and accurate distance calculations relative to the communication device location.

In one illustrative example, the communication device continues internal maintenance routines that keep the device functional (e.g., keeps the device from locking up) but suspends non-critical voice and non-voice processes. Suspending the non-voice processes include, for instance, idling (e.g., reducing and in some cases stopping) input/output and peripheral machine access controls (MACs). Moreover, the communication device can be configured to activate pre-programmed and predictable timing functions and features (such as emergency codes), which may be associated with a calibrated processing state of the communication device, to manage its internal processing delays; wherein the internal processing delay is, for instance, a delay between the communication device receiving (202) the request to generate location signals and the communication device responsively transmitting the first location pulse.

After suspending appropriate internal processes, the communication device configures (206) the FGU to generate (208) the location signals and then transmits (208) a location signal sequence that may have multiple location pulses to the reference device. The transmission of location signals that are substantially equivalent is achieved based on recursive sequencing from the reference device during a training process, or based on a stored internal calibrated processing state that was previously associated with a calibrated internal time delay for the communication device during training. The communication device, for example, selects the initial slope for the first ramp of the signal, initializes an up ramp and/or down ramp counter, locks to a start frequency wideband channel, and sets the location signal iteration count. In addition, for the FIG. 4 FGU implementation, the communication device changes a loop filter from a narrowband operation (for normal operations) to a wideband operation for generating the location signals, and sets a charge pump gain corresponding to the initial slope for the location signal.

After the communication device transmits (208) the required number of chirp pulses in the sequence, the communication device reconfigures (210) the FGU for normal operations on the narrowband channel 115 and then resumes (212) the normal narrowband radio operations.

In accordance with one embodiment, the location signal is a "chirp" signal generated using the FGU of the communication device. Frequency selection (or programming) in a frequency synthesizer is accomplished via a control signal that can be either analog or digital depending on the particular FGU implementation. For example, when the control signal, such as a current or voltage source, is applied to an oscillator (e.g., a Voltage Controlled Oscillator (VCO) or a Current Controlled Oscillator (CCO)), the oscillator moves from a first frequency to the programmed frequency for normal radio operations. However, the frequency change is not immediate and, in fact, occurs over a short period of time creating what is commonly referred to as "chirp". In this context, slope characteristics of the chirp are not dynamically controlled based on one or more programmable parameters but are simply intrinsic to the hardware limitations, which is different from the teachings herein. As a consequence, known chirp signal frequency responses are non-linear.

However, as the term is used herein, a chirp signal is defined as a controlled RF signal with a predefined (based on one or more received programmable parameters) wideband linear frequency swept response of relatively short time duration (e.g., 22 micro-seconds) that is generated using the FGU. The FGU 125 with CGC 127 receives from a reference device at least one chirp control parameter defining pulse shape characteristics of the chirp signal and responsively programs or configures (used herein interchangeably) frequency synthesizer circuitry to sweep the output RF frequency over a wide range of frequencies (e.g., 50 MHz) (from an initial frequency to a final frequency) to generate a wideband chirp (location) signal that the communication device sends to the reference device 110 over the wideband channel 117. This programmable chirp signal can include one or more chirp pulses with each chirp pulse comprising a frequency sweep of one or more continuous linear frequency ramps from an initial frequency to an end frequency.

The typical Frequency Modulated (FM) chirp signal is represented in equation 1.0 below, where f is the carrier (or IF) frequency, K is the chirp slope, T is the chirp duration period in seconds and the function rect(.) represents the pulse shape of a chirp (single ramp) signal. Equation 1.0 is the complex representation of the transmitted signal.

$$s_1(t) = rect\left(\frac{t}{T}\right)e^{j2\pi\left(ft + \frac{Kt^2}{2}\right)} \quad (1)$$

FIG. 3 represents a time domain waveform (302) for the chirp signal of equation (1) and a frequency ramp response (304) (e.g., corresponding to a VCO frequency output versus time) for the chirp signal. FIG. 3 shows an illustrative ideal chirp signal that ramps from an initial frequency $f_1$ to a second frequency $f_2$ at a selected slope from a time $T_1$ to $T_2$. However, in accordance with the teachings herein, a two-part chirp signal can also be generated; wherein with respect to the chirp signal shown in FIG. 3, the signal part 304 would be followed by a second signal part (not shown) that ramps from the second frequency $f_2$ to a final frequency $f_3$ at a selected slope from time $T_2$ to a final time $T_3$. In some embodiments, frequency $f_1$ may equal frequency $f_3$; however, this is not required.

A characteristic of the chirp signal generated in accordance with the teachings herein, is that all portions of the chirp signal are phase incoherent (unlike conventional radar technology). A signal being phase-incoherent, as the term is defined herein, means that there exists no predetermined phase relationship between the reference device internal timing sources and the phase of the in-bound location pulse signal; e.g., the in-bound location pulse signal does not contain coherent phase modulated information. However, other methodologies besides phase modulation may be used to carry information in the chirp signal as relates to the communication device sending the chirp signal or a user of that communication device. For example, data parameters such as communication device identification (ID), location (e.g., coordinates) of the communication device, biometrics information, "emergency man down" or other critical information, etc., can be embedded in the chirp signal.

Example methodologies that can be used to embed the data parameters in the chirp signal include, but are not limited to, using a combination of different values of start (e.g., $f_1$), intermediate (e.g., $f_2$), and final frequencies within a given chirp pulse (e.g., where the first, intermediate, and final frequencies are all different; or the first and final frequencies could be the same); variation in slope (e.g., slope magnitude and/or polarity); number of chirp pulse iterations; segmenting the chirp location signal into a plurality of contiguous segments, with each segment exhibiting different slopes and timing durations, instead of a single slope from the start frequency (e.g., $f_1$) to the intermediate frequency (e.g., $f_2$) in the first part of the chirp signal and a second fixed slope from the intermediate frequency (e.g., $f_2$) to the final frequency of the second part of the chirp signal; etc.

With regard to a particular illustrative use of methodologies to communicate one or more data parameters in the chirp signal, a plurality of communication devices could be calibrated with each device having a different slope magnitude or combination of slopes for the first and second portions of the chirp location signal. In this manner, each slope or combination of slopes of a given chirp pulse is associated with a different communication device and, thereby, conveys communication device ID. The chirp pulse could also include changes in the linear slope for a given slope polarity (i.e., multiple slope iterations in one part of a chirp pulse) that can be calibrated to be associated with information such as biometrics or emergency information that can be, for instance, communicated in chirp pulses when a user of the device is unable to otherwise normally transmit on the communication device. The latter embodiment could be associated with an emergency button that a user can press to send chirp pulses that have the embedded emergency information, wherein the pulse sequence can also be used to determine the distance of the communication device.

Regarding the circuitry used to generate the chirp signal, in the FIG. 4 FGU embodiment, the CGC sequences a charge pump so as to steer the VCO to generate the chirp signal. In another embodiment, the CGC 127 controls a tap selection network to sequentially select taps from the delay line to generate the chirp signal. Correspondingly (although not shown in FIG. 1), the reference device 110 includes counterpart circuitry in its receiver apparatus to properly receive the chirp signal. When the chirp signal has one part that slopes in one direction, the reference device 110 comprises an APCO modem and a chirp receiver incorporating an up-ramp (+K) or a down-ramp (-K) correlator filter matched to the location pulse characteristics (e.g., the slope frequency response of the chirp signal). In the alternative embodiment, where the chirp signal has two parts, the chirp receiver of the reference device 110 includes a splitter for splitting the received chirp signal, up-ramp (+K) and down-ramp (-K) matched correlator filters, and a microprocessor for controlling the up-ramp and down-ramp matched correlator filters.

Turning now to the detailed description of generating chirp location signals using the PLL FGU topology. FIG. 4 illustrates a PLL FGU 400 in accordance with some embodiments. PLL 400 comprises a Programmable Synthesizer 410, with chirp signal generation capability, of either Integer or Fractional N design, an Adjustable Loop Filter 426, a Temperature Compensated Crystal Oscillator (TCXO) 406, a Radio Controller 402 with Memory 404, a Voltage Controlled Oscillator (VCO) 428 and a VCO Buffer 430. More particularly, Synthesizer 410 comprises (optionally) a modulation block 416, and further comprises dividers & accumulators 414, an adjustable (programmable) charge pump (CP) 418 having a variable gain, a phase detector (PD) 420, a reference frequency divider (/R) 422, and Chirp Generation Control circuitry (CGC) 424 for controlling the Charge Pump 418, the loop filter 426, and various timers (not shown) that serve as a timing source, to generate chirp signals in accordance with embodiments described herein.

The CGC 424 comprises any control system that regulates the suspension of normal closed loop PLL operation for discrete frequency generation, and manages the FGU during swept frequency chirp signal generation. For the present example illustrated in FIG. 4, the CGC is a logic control system that, once triggered, reconfigures the FGU from normal closed loop operation, sequences the VCO through a plurality of precision swept frequency responses, and reconfigures the FGU back to nominal closed loop operation. The CGC may contain dividers, logic counters, signal multiplexers, and mechanisms for storing timing, CP gain settings and transition thresholds associated with the chirp location signal. However, the CGC need not be limited in this fashion, but may include specialized micro-processor controllers, Field Programmable Gate Arrays (FPGA) or other autonomous control mechanisms as may be required for proper chirp signal generation. Alternatively, as will be discussed when reviewing FIG. 10, the CGC may simply be different sequencing within a program code that controls the closed loop FGU operation, in which case the CGC comprises the algorithm within the micro-processor controlling the FGU.

During normal operations, the PLL 400 generates RF signals 440 at the output of buffer 430 of predetermined frequencies using a technique that includes coupling an output 438 of the VCO 428 to the frequency divider & accumulators 414, which can have modulation capability 416. The output of the frequency divider & accumulators 414 provides one input to the phase detector 420, reflecting the current operating frequency of the VCO. Another input to the phase detector 420 is a frequency which is derived by dividing down the TCXO 406 signal by the Reference Frequency Divider 422. The TCXO 406 is a specialized component that generates a reference frequency having high stability characteristics over a range of extreme operating conditions.

In essence, during normal operations, the Synthesizer 410 operates in a closed loop fashion, wherein the Phase Detector 420 determines the difference in phase between its two inputs. The Phase Detector 420 responsively generates a control signal proportional to the phase difference and directs the control signal to charge pump 418. In response to the PD control signal, the charge pump generates an output signal 434 comprising a series of contiguous current pulses, each pulse polarity being either current sink or source pulses as determined by the PD error signal. These current pulses in output signal 434 are filtered by the synthesizer loop filter 426, which is configured for narrowband operations, and applied to the VCO 428 as a variable control voltage 436. The control voltage 436 from the loop filter 426 controls the VCO 428 output frequency 438. As will be apparent to those skilled in the art, the PD control signal effectively steers the control voltage 436 to reduce the previously detected phase difference between the inputs of the phase detector.

The PLL synthesizer 410 is programmed by the Radio controller 402 over an SPI (serial peripheral interface) 408 in order to generate fixed frequencies (stored in memory 404) within the operating range of the VCO 428. The Radio controller 402 also programs the CGC 424 to transform the PLL 400 into a frequency sweeper or CHIRP generator (CHIRP mode), in accordance with the teachings herein, as further illustrated by reference to FIGS. 5 through 9.

In the CHIRP mode of operation, upon receiving a command to generate the chirp signal, the radio controller 402 provides control signals over the SPI 408 to the synthesizer 410 that disables the Modulation component 416 and the Dividers & Accumulators component 414. The control signals also cause the CGC 424 to: (1) disconnect the Phase Detector 420 from Charge Pump 418 so that the synthesizer 410 operates in an open loop fashion, wherein the control of the Charge Pump 418 is transferred to the CGC 424; (2) adjust the loop filter 426 for wideband operations using a loop filter adjust signal 432, wherein the loop filter 426 effectively operates as a capacitive element with a reactive value that sets a fixed integration time constant as may be necessary to transform the PLL synthesizer 410 into a frequency sweeper (or chirp generator) based on the VCO gain and charge pump gain; (3) initialize programmable counters (or timers) to control the duration of the charge pump 418 sourcing or sinking 434 and a CHIRP sequencer/counter that defines frequency sweep repetitions; and (4) restore the FGU to the normal operating mode once the frequency sweep repetitions are complete.

Figure 5:
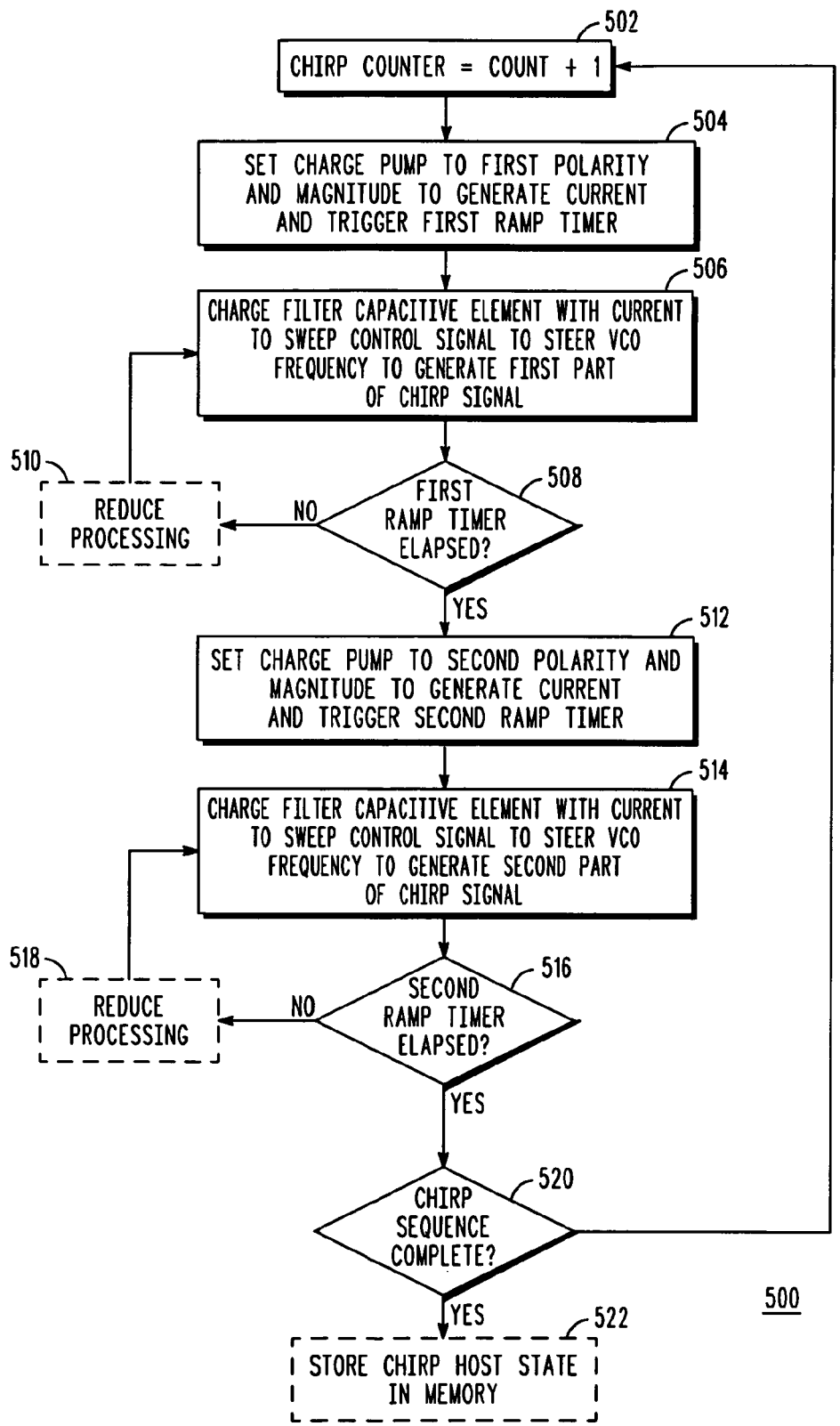
FIG. 5 is a flow diagram of a method for generating a chirp sequence in the PLL FGU of FIG. 4 in accordance with some embodiments.

More particularly, with respect to FIG. 5, the CGC 424 initializes (502) the CHIRP sequencer. Included in the control signals from the radio controller 402 to the CGC 424 is a first chirp generation programming word that causes the CGC to: tune the VCO output signal 438 to an initial start frequency $F_{start}$; set (504) the charge pump to its initial polarity and magnitude to continuously source (in this case) a current 434 at the given magnitude; and trigger (504) the first ramp timer that controls the duration of the continuous current 434. A constant charge pump current 434 setting integrated by the loop filter 426 capacitance for a set period of time (506, 508) will cause the VCO output frequency to "sweep" from the initial start frequency to a stop frequency at a rate set by the following formula:

$$I = C\, dV/dt, \qquad (2)$$

where C=loop filter 426 pole capacitance when configured for wide band operation, I=charge pump current 434 set at constant source/sink operation by CGC, V=VCO control voltage 436, and dt=time duration (508) during which the charge pump current is held at a constant magnitude and polarity.

Figure 6:
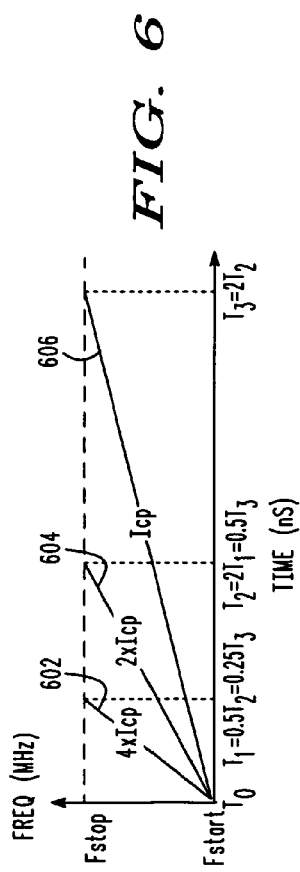
FIG. 6 shows how to vary the slope of a chirp signal having a positive slope in accordance with some embodiments.

Referring for the moment to FIG. 6, illustrated are three chirp up-ramp pulses 602, 604, and 606 sweeping from an initial frequency $F_{start}$ to a given stop frequency $F_{stop}$. Ramp 606 is generated by a sourcing current of magnitude $I_{cp}$ charging the loop filter capacitive element for a time $T_3$. Ramp 604 is generated by a sourcing current of magnitude $2I_{cp}$ charging the loop filter capacitive element for a time equal to half of time period $T_3$ or $T_2=0.5T_3=2T_1$. Ramp 602 is generated by a sourcing current of magnitude $4I_{cp}$ charging the loop filter capacitive element for a time $T_1=0.5T_2=0.25T_3$.

All three swept responses 602, 604, and 606 are governed by the response equation (2), wherein charge pump current 434 (I) is equal to $4I_{cp}$, $2I_{cp}$, and $I_{cp}$ for 602, 604 and 606 respectively. When loop filter 426 is configured for a fixed integration capacitance C during wide band operation, the slope of the frequency response (ramp time) is determined by the magnitude of the charge pump current 434 and the duration during which the charge pump 418 is set to a fixed current and polarity, also referred to as an integration period dt. As the charge pump 418 output current increases, the time it takes to arrive at a given stop frequency $F_{stop}$ decreases. More particularly, FIG. 6 shows that as the charge pump current is doubled, the time it takes to sweep from $F_{start}$ to $F_{stop}$ is halved.

The same principle applies whether the ramp being generated is a "positive" slope (as shown in FIG. 6) or a "negative" slope, with the slope change being facilitated by switching the charge pump 418 current polarity (source-to-sink or sink-to-source). Therefore, by setting (504) the charge pump gain to a level that matches the known loop filter integration capacitance, and waiting (508) a length of time as necessary to generate the desire stop frequency, a ramp up (in this case) response is generated (506) corresponding to half of a chirp pulse in this illustrative implementation. Once the targeted stop frequency (which is an intermediate frequency for a chirp pulse having two parts) is reached, the CGC 424 uses a second chirp generation programming word from the radio controller 402 to: set (512) the charge pump to the opposite polarity and to a desired magnitude to continuously sink a current 434 at a given magnitude; and trigger (512) a second ramp timer that controls the duration of the CP current 434 to form a ramp down response (in this case). As noted for the previous ramp-up response, by setting charge pump current 434 to a fixed level, and knowing the loop filter 426 capacitance, defines a dynamically programmable period of time (514, 516) in which the VCO output frequency is swept from the intermediate frequency to a final frequency, wherein the resulting chirp pulse 440 is output from the buffer 430. As will be apparent to those skilled in the art, for a given fixed capacitance value in loop filter 426, a change in charge pump current for the second part of the chirp signal will result in a change in the slope compared to the first part of the chirp signal The frequency sweeping or CHIRP generator mode is maintained and method 500 of FIG. 5 is repeated to generate additional chirp pulses until (520) the number of chirp sequences is complete as defined by the CHIRP sequence counter 502. Once the CHIRP sequence ends, the PLL is configured for nominal operation. The entire CHIRP sequence can last several hundred microseconds and can be managed by either internal synthesizer timers or directly by the Radio Controller 402 or a combination of the two.

Figure 7:
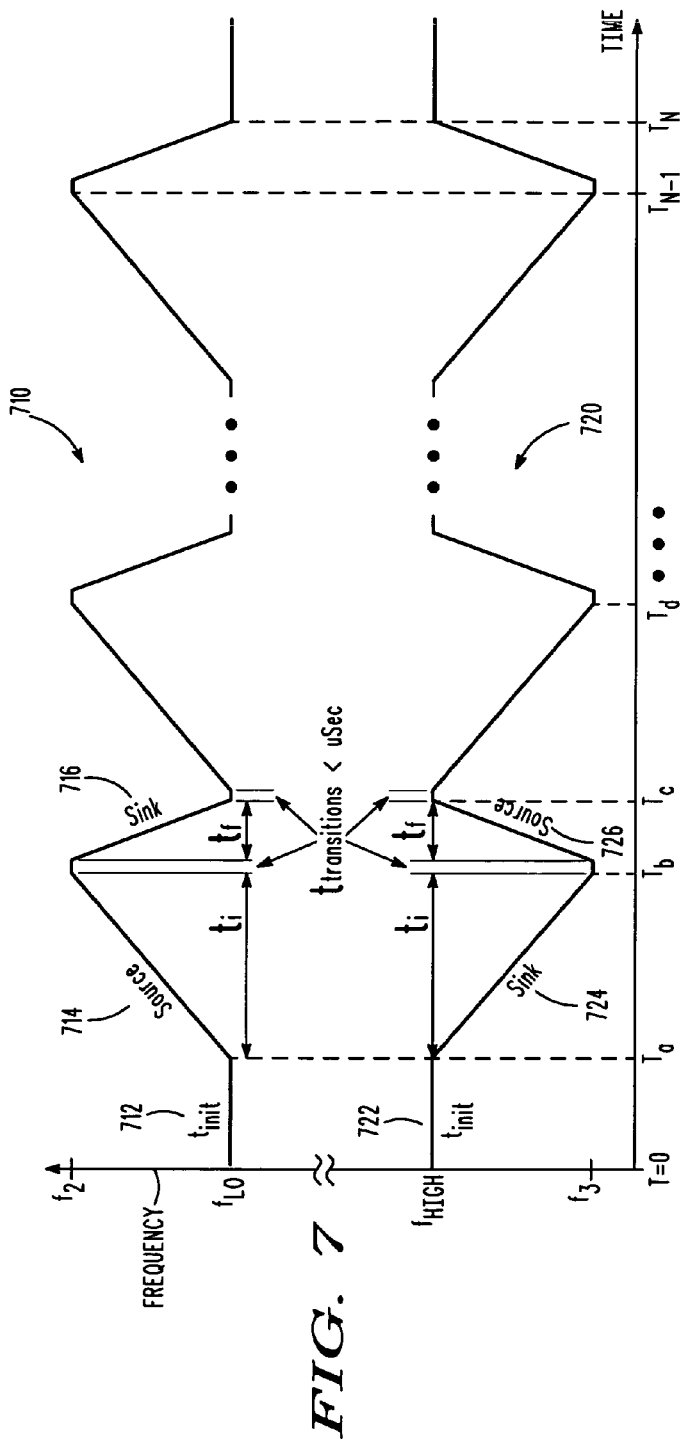
FIG. 7 illustrates a chirp sequence starting from a low frequency and a chirp sequence starting from a high frequency in accordance with some embodiments.

FIG. 7 illustrates two complete chirp sequences 710 and 720 each comprising a plurality of two-part chirp pulses. Beginning at time T=0, the first timer is triggered for duration $t_{init}$ 712 to set the VCO output frequency to an initial frequency $f_{LO}$. After the first time duration 712 is complete at time $T_a$, an up ramp 714 of first chirp pulse of sequence 710 is generated by applying a charge pump source current to an integration capacitive element within the loop filter 426 for a time interval ti. During time interval $t_i$, the VCO frequency is swept from the initial frequency $f_{LO}$ to an intermediate frequency $f_2$. For illustrative purposes, the start frequency $f_{LO}$ for chirp sequence 710 is lower than the intermediate frequency $f_2$. After time interval $t_i$ has elapsed at time $T_b$, the down ramp 716 of the first chirp pulse is generated by applying a charge pump sink current of higher magnitude than was used for up ramp 714 for a time interval $t_f$. Note that the final time interval $t_f$ is shorter than initial time interval $t_i$ because the charge pump current setting for interval $t_f$ is higher. For a fixed integration capacitance in loop filter 426, the ratio of time intervals ($t_i/t_f$) is equal to the ratio of (charge pump sink current/charge pump source current). During time interval $t_f$, the VCO frequency is swept from the intermediate frequency to a final frequency, which in this case is the starting frequency $f_{LO}$. After time interval $t_f$ has elapsed at time $T_c$, additional chirp pulses (N pulses) are generated in the same manner until the chirp sequence 710 is complete at time $T_N$.

Similarly for chirp sequence 720, beginning at time T=0, the first timer is triggered for duration $t_{init}$ 722 to set the VCO output frequency to an initial frequency $f_{HIGH}$. After the first duration 722 is complete at $T_a$, a down ramp 724 of first chirp pulse is generated by applying a charge pump sink current for a time period $t_i$ to an integration capacitive element with loop filter 426. During time interval $t_i$, the VCO frequency is swept from the initial frequency $f_{HIGH}$ to an intermediate frequency $f_3$. Note that $f_2$ of chirp sequence 710 does not have to equal $f_3$ of chirp sequence 720. For illustrative purposes, the start frequency $f_{HIGH}$ for chirp sequence 720 is higher than the intermediate frequency $f_3$. After time interval $t_i$ has elapsed at time $T_b$, the up ramp 726 of the first chirp pulse is generated by applying a charge pump source current of higher magnitude than was used for down ramp 724 for a time period $t_f$. During time interval $t_f$, the VCO frequency is swept from the intermediate frequency to a final frequency, which in this case is the starting frequency $f_{HIGH}$. After time interval $t_f$ has elapsed at time $T_c$, additional chirp pulses (N pulses) are generated in the same manner until the chirp sequence 720 is complete at time $T_N$. FIG. 7 further shows that, in operation, there may be some brief (e.g., less than 1 uSec) time transition between the generation of the first and second halves of a chirp pulse and between consecutive pulses.

Turning back to FIG. 5, when a chirp sequence is generated for location determination, generally, before generating the chirp sequence, the communication device sets its internal processing to a calibrated state which generates a calibrated internal processing time delay within the communication device; wherein the calibrated time delay comprises a steady state internal processing delay for the communication device. However, when the chirp sequence is generated while the communication device is being calibrated by the reference device, the communication device continues to adjust, e.g., reduce (510, 518) internal processes as appropriate to generate a steady state chirp signal that corresponds to the calibrated internal processing delay for the communication device.

In accordance with this embodiment, after each chirp pulse during the training process, the reference device calculates an intermediate processing delay (also referred to as an intermediate time delay) for the communication device and may transmit the value of the intermediate time delay to the communication device to facilitate the optimization (minimization) of non-critical internal processes. The training is continued until the calibrated internal processing delay is reached in the communication device. The communication device associates its calibrated processing state to the calibrated internal processing delay (also referred to as the calibrated time delay) that was determined during training and stores (522) the process configuration associated with the calibrated time delay in memory 128 of FIG. 1.

Figure 8:
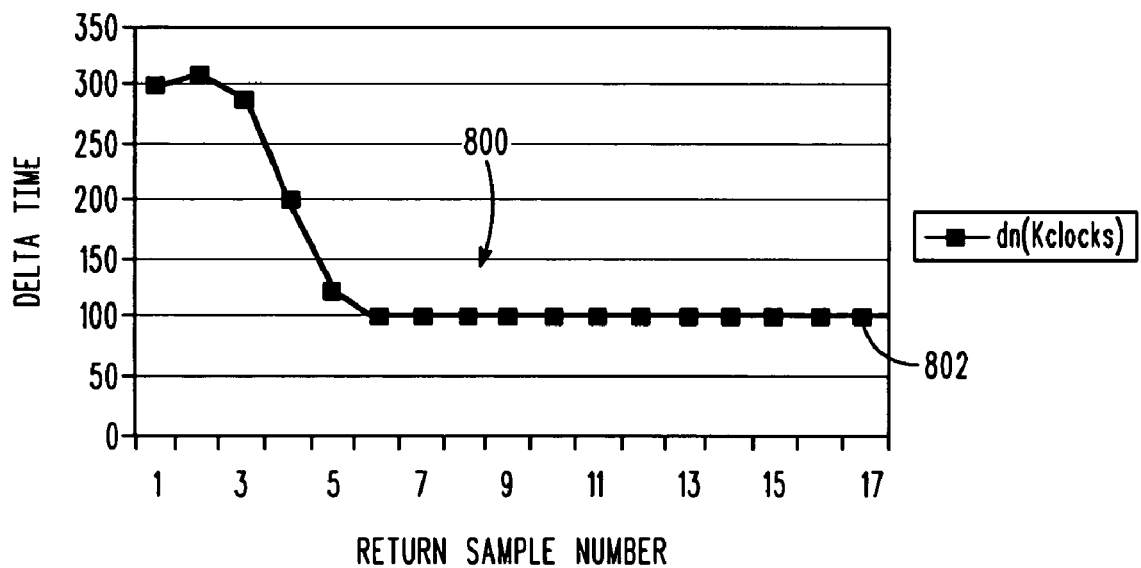
FIG. 8 illustrates a converged radio response time for a communication device in accordance with some embodiments.

FIG. 8 illustrates a convergence of intermediate time delays associated with minimizing the internal processing delay of a communication device, in accordance with some embodiments. As shown in FIG. 8, the intermediate time delay (delta time) is plotted on the Y-axis. The return sample number designated along the X-axis may be the number of single pulse location signals sent in response to individual requests from the reference device. Alternatively, the return sample number may also be the number of completed chirp up-down ramps that make up a single chirp sequence as illustrated in 710 or 720 of FIG. 7, which is transmitted in response to a single request from a reference device. The curve 800 shows the intermediate time delay for each of the pulses. More particularly, the time delay (delta T) illustrates a plurality of intermediate time delays with initial variation that becomes substantially the same after the seventh $7^{th}$ pulse.

Once a steady state time delay is achieved, and if the time delays are being measured during training, a calibrated time delay is measured and associated with a known range measurement. More particularly, the intermediate time delay is said to have reached steady state when the time difference between consecutive contiguous intermediate time delays is equal to or less than the desired resolution for locating the communication device. The calibrated time delay is identified as the final delay 802 in curve 800. Although it can take several pulses to train the communication device, at 5 thousand pulses-per-second (pps) the entire training process will be less than a few hundred milliseconds. The number of chirp pulse iterations needed to achieve steady state depends on the targeted accuracy for locating the communication device.

In another embodiment, as briefly mentioned above, there can be several slope transitions in a given portion of the chirp pulse. FIG. 9 shows this embodiment. More particularly, FIG. 9 shows a ramp sequence 900 with two chirp pulses 910 and 920, which has a plurality of slopes in an up ramp 902 between frequencies $F_1$ and $F_2$, and a plurality of slopes in a down ramp 904 between frequencies $F_2$ and $F_1$. Each slope is generated similarly to how the slopes were generated with respect to FIG. 5. More particularly, each slope (of the multiple slopes) in chirp pulses 910 and 920 comprises a linear frequency sweep (or ramp) between two terminus frequencies, in accordance with the teachings herein. Such a signal with multiple slope transitions can be used to embed one or more data parameters, as discussed earlier.

Turning now to FIG. 10, this drawing depicts another example of a FGU (with CGC) 1000 that is implemented as a delay locked loop (DLL) and can be used to generate a chirp signal at a FGU output 1002. The FGU 1000 includes a phased locked loop (PLL) 1004, optionally a divider 1006, a phase detector 1008, a charge pump 1010, a plurality of delay elements (e.g. buffers) 1012-1, 1012-2, 1012-3, 1012-4, 1012-N-1, 1012-N that collectively form a delay line 1012, and a tap selection network 1014. During operation, the DLL 1000 generates a reference frequency $F_{ref}$ 1016 from PLL 1004. The reference frequency may be divided down at divider 1006, wherein the divider output frequency CLK__2kFd 1018 is a frequency that is at least 2 times k times the highest frequency to be available at output signal 1002. The value of k is a number equal to or great than 1. For improved frequency resolution, k may be scaled to the ratio of the highest and lowest terminus frequencies of the chirp location signal that is sourced at output 1002 (e.g., $F_{stop}/F_{start}$ of FIG. 3). For example, if $F_{start}$=100 MHz and $F_{stop}$=300 MHz, then k=3.

Each delay element 1012-1 through 1012-N induces an incremental time delay in its output signal relative to the input signal, forming a plurality of signals at tap terminals 0, 1, 2, 3, 4 through N. The operating frequency at taps O through N is equal to CLK__2kFd; however, each signal is offset from the other in time by a fixed delay (phase delay) as determined by delay elements 1012. Therefore, there exists a plurality of high frequency signals at the tap inputs O through N, each signal being offset from each other by an incremental time delay.

The time delay of each of the delay elements 1012-1 through 1012-N is controlled by a voltage control ($V_{CNTRL}$) signal 1026 that is tied to ground through a capacitive element 1024. For example, the phase detector receives both the clock signal 1018 and a delayed clock signal 1020 from the delay element 1012-N, and produces a phase detection signal 1022 ($P_{Det}$) that represents a phase difference between the clock signal 1018 and the delayed clock signal 1020. The phase detection signal is communicated to the charge pump 1010, which produces the voltage control 1026 that is proportional to signal 1022 and that is communicated to each of the delay elements 1012-1 through 1012-N. Control voltage 1026 progressively adjusts the phase lock of the delay among the delay elements 1012-1 through 1012-N in tandem so that the phase difference between the input clock signal 1018 and the delayed clock signal 1020 is separated by one or more time periods of the reference clock signal 1018. In one embodiment, the phase detector 1008 phase locks reference clock signal 1018 to the delayed clock signal 1020, wherein the difference in absolute time is one period of reference signal 1018 (i.e., signal 1018 and 1020 are phase locked together, with signal 1020 lagging 1018 by exactly one period).

The number of delay elements 1012-1 through 1012-N is selected based on the phase (e.g., time) resolution desired in generating the transitions that are needed to create the chirp location signal at output 1002. For example, if an input signal 1018 is Clk__2kFdf=GHz (1 nano-second period) and if there are 1023 tap elements ($2^{10}$−1 taps) then each delay element 1012 is 0.978 pico-seconds (1 nS/1023). This means that when generating a frequency at output 1002, the tap selection network picks the phase transition from the plurality of transitions within output signals at taps 0, 1, 2 through N that is proximate within 0.978 pico-seconds of the ideal frequency.

To generate a frequency, the tap selection network 1014 is sequenced by a suitable program code 1028. The program code 1028 identifies a particular order of specific delay output signals among the signals 0 through N that, when taken in sequence relative to the reference clock frequency 1018, generates the corresponding transitions for correct piece-wise construction of the desired output signal 1002. In one embodiment, the program code 1028 is determined prior to frequency generation by the communication device host processor, which functions as the CGC. Thus, for the DLL, configuring the FGU for chirp mode is accomplished by programming the tap selection network 1014 via the program code 1028.

For generating a single fixed frequency, as is needed during normal narrow band operation, the tap selection sequence as programmed by program code 1028 is cyclical in nature, forming a repeating sequence of tap inputs to be selected over time. The tap cycle is related to the periodicity of the frequency that is being generated. However, when generating a chirp location signal, the tap sequencing is set by the varying periodicity of the phase transitions that make up the swept frequency response of the chirp signal. Referring to 302 of FIG. 3, the 180 degree phase transitions occur with increasing frequency over time, which means that the tap selection sequence is continuously varying to select the appropriate tap having an output signal that matches the same phase transition point as needed to create the swept frequency response.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for generating location signals described herein. The non-processor circuits may include, but are not limited to, a radio receiver, a radio transmitter, signal drivers, clock circuits, power source circuits, and user input devices. As such, these functions may be interpreted as steps of a method to perform generating location signals described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for generating and transmitting signals including location signals, the method comprising:
   in a first frequency generation unit (FGU) mode of operation for generating and transmitting non-location signals, configuring the FGU to:
      maintain a phase relationship between an output of the FGU and a reference clock,
      output a non-location output signal for use in transmitting non-location information signals to another wireless device; and
   in a second FGU mode of operation for generating and transmitting location signals, configuring the FGU to:
      receive, from a reference device, at least one location signal control parameter that defines a pulse shape characteristics for a location signal;
      refrain from maintaining the phase relationship between the output of the FGU and the reference clock;
      generate a linear first part of a location signal, being phase incoherent relative to the reference clock as a result of the refraining, and having the defined pulse shape characteristic by progressively sweeping an output of the FGU over a range of frequencies from a first frequency to a second frequency within a first time period in accordance with the location signal control parameter; and
      transmitting at least one iteration of the first part of the location signal.

2. The method of claim 1 further comprising:
   generating a linear second part of the location signal having the defined pulse shape characteristic by progressively sweeping the output of the FGU back over at least a portion of the range of frequencies from the second frequency to a final frequency within a second time period; and
   transmitting the second part of the location signal directly following transmission of the first part of the location signal.

3. The method of claim 2, wherein the first frequency is the same as the final frequency.

4. The method of claim 2 further comprising, in the second mode of FGU operation, communicating a data parameter in the location signal by modulating values of at least one of the first frequency, the second frequency, or the final frequency.

5. The method of claim 4, wherein the first frequency, the second frequency, and the final frequency are all different.

6. The method of claim 2, wherein progressively sweeping the output of the FGU over the range of frequencies comprises sweeping the output of the FGU along a plurality of changing linear frequency slopes to communicate a data parameter in the location signal based on at least one of the linear frequency slopes.

7. The method of claim 6, wherein the plurality of changing linear frequency slopes comprises:
   a first linear slope from the first frequency to the second frequency, with the first linear slope having a first polarity; and
   a second linear slope from the second frequency to the final frequency, with the second linear slope having an opposite polarity from the first polarity.

8. The method of claim 6, wherein the plurality of changing linear frequency slopes comprises a first plurality of different linear frequency slopes in the first part of the location signal, with each of the first plurality of slopes having the same first polarity.

9. The method of claim 8, wherein the plurality of changing linear frequency slopes comprises a second plurality of different linear frequency slopes in the second part of the location signal, with each of the second plurality of slopes having the opposite polarity from the first polarity.

10. The method of claim 1 further comprising, in the second FGU mode of operation:
    setting, to a calibrated state, internal processing of a device that generates the location signal, wherein the calibrated state generates a calibrated time delay within the device, wherein the calibrated time delay comprises a steady state internal processing delay for the device; and generating the first part of the location signal while in the calibrated state.

11. The method of claim 10, wherein the calibrated state is determined by:

iteratively, generating and transmitting the first part of the location signal; and adjusting the internal processing to reduce internal processing delay, until the calibrated time delay is determined; and when the calibrated time delay is determined, associating the calibrated time delay to an internal processing state, which is stored as the calibrated state.

12. The method of claim 11, wherein the calibrated state is further determined by:

iteratively, receiving an intermediate time delay value in response to the location signal transmission; and adjusting the internal processing based on the intermediate time delay value, until the calibrated time delay is determined.

13. The method of claim 1, wherein the at least one location signal control parameter is received over a narrowband wireless channel while the FGU is in the first FGU mode of operation and the location signal is transmitted over a wideband wireless channel while the FGU is in the second FGU mode of operation.

14. The method of claim 1, wherein the FGU comprises a timing source, a control signal source having variable gain to generate a current control signal or a voltage control signal, and an oscillator responsive to the control signal.

15. The method of claim 14, wherein progressively sweeping the output of the FGU over the range of frequencies comprises:

for the first time period, sweeping an output of the oscillator along a first linear frequency slope from the first frequency to the second frequency, wherein the first linear frequency slope has a first polarity and is set based on a first gain setting for the control signal source and the first time period as set by the timing source.

16. A method for generating a location signal comprising:

receiving, in a communication device from a reference device, at least one location signal control parameter that defines a pulse shape characteristic for a calibrated location signal;

setting internal processing of the communication device to a calibrated state, wherein the calibrated state generates a calibrated time delay within the communication device, wherein the calibrated time delay comprises a steady state internal processing delay for the communication device;

configuring a frequency generation unit (FGU) of the communication device based on the at least one location signal control parameter;

starting at a first frequency and progressively sweeping an output of the FGU over a first range of frequencies to a second frequency, wherein the output is swept along at least one linear frequency slope having a first polarity to generate a first part of the calibrated location signal having the defined pulse shape characteristics;

progressively steering the output back over at least part of the first range of frequencies from the second frequency to a final frequency, wherein the output is swept along at least one linear frequency slope having an opposite polarity from the first polarity to generate a second part of the calibrated location signal having the defined pulse shape characteristics; and sequentially transmitting the first and second parts of the calibrated location signal.

17. The method of claim 16, wherein at least the first frequency and the second frequency have different values, the method further comprising:

communicating a data parameter in the calibrated location signal by modulating at least one of the values of the first frequency, the second frequency, or the final frequency.

18. The method of claim 16 further comprising communicating a data parameter in the calibrated location signal by modulating at least one of the linear frequency slopes.

* * * * *

UNITED STATES PATENT AND TRADEMARK OFFICE
CERTIFICATE OF CORRECTION

PATENT NO. : 8,063,823 B2  
APPLICATION NO. : 12/335091  
DATED : November 22, 2011  
INVENTOR(S) : Ruelke et al.

Page 1 of 1

It is certified that error appears in the above-identified patent and that said Letters Patent is hereby corrected as shown below:

In Column 15, Line 24, delete "O" and insert -- 0 --, therefor.

In Column 15, Line 28, delete "O" and insert -- 0 --, therefor.

In Column 18, Line 8, in Claim 1, delete "characteristics" and insert -- characteristic --, therefor.

Signed and Sealed this
Twenty-fifth Day of December, 2012

David J. Kappos
*Director of the United States Patent and Trademark Office*